252-8.511 SR
A5596 OR T 104,401

United States Defensive Publication [19] (H) [11] T104,401
Majewicz [43] Jul. 3, 1984

[54] CARBOXYMETHYL HYDROXYETHYL CELLULOSE AS A THICKENER FOR DRILLING MUD

[76] Inventor: Thomas G. Majewicz, R.D. 1, Box 285, Chadds Ford, Pa. 19317

[21] Appl. No.: 448,136

[22] Filed: Dec. 9, 1982

[51] Int. Cl.[3] ..... C09K 7/00
[52] U.S. Cl. ..... 252/8.5 A; 252/8.5 C; 536/91

[57] ABSTRACT

Carboxymethyl cellulose has not heretofore been universally useful as a thickener for drilling muds due to sensitivity of its aqueous solutions to the high level of inorganic salts contained in such muds. The inclusion in the carboxymethyl cellulose of hydroxyethyl functionality reduces this salt sensitivity to a level where it can be employed to thicken drilling muds, even those containing calcium salts. Carboxymethyl hydroxyethyl cellulose of carboxymethyl D.S. of 0.1 to 1.0 and hydroxyethyl M.S. of 0.5 to 2.5 are useful.

2 Claims, No Sheets Drawing,
6 Pages Specification

The file of this unexamined application may be inspected and copies thereof may be purchased (849 O.G. 1221, Apr. 9, 1968).